United States Patent [19]

Stumphauzer et al.

[11] Patent Number: 5,549,037

[45] Date of Patent: Aug. 27, 1996

[54] GAS GENERATOR ATTACHMENT

[75] Inventors: William C. Stumphauzer, Elyria; Hugh F. Groth, Richfield; John K. Duncan, Solon, all of Ohio

[73] Assignee: Effervescent Products, LLC, Lorain, Ohio

[21] Appl. No.: 546,534

[22] Filed: Oct. 20, 1995

Related U.S. Application Data

[63] Continuation-in-part of Ser. No. 337,870, Nov. 14, 1994, Pat. No. 5,460,846, which is a continuation-in-part of Ser. No. 215,424, Mar. 21, 1994, abandoned.

[51] Int. Cl.$^6$ .................................. A23L 2/00; B01F 3/00
[52] U.S. Cl. ...................... 99/323.1; 99/275; 261/DIG. 7
[58] Field of Search ............................... 99/323.1, 323.2, 99/275, 472, 516, 536; 426/477; 261/DIG. 7; 222/1, 129.1; 422/305, 239, 277; 141/19, 98, 329

[56] References Cited

U.S. PATENT DOCUMENTS

| | | | |
|---|---|---|---|
| 2,447,716 | 8/1948 | Rowe | 426/477 |
| 4,040,342 | 8/1977 | Austin et al. | 261/DIG. 7 |
| 4,222,972 | 9/1980 | Caldwell | 426/477 |
| 4,316,409 | 2/1982 | Adams et al. | 99/275 |
| 4,458,584 | 7/1984 | Annese et al. | 99/323.1 |
| 4,466,342 | 8/1984 | Basile et al. | 99/323.1 |
| 4,475,448 | 10/1984 | Shoaf et al. | 99/323.1 |
| 4,786,519 | 11/1988 | Gupta | 426/561 |
| 5,192,513 | 3/1993 | Stumphauzer et al. | 422/305 |
| 5,260,081 | 11/1993 | Stumphauzer et al. | 99/323.1 X |
| 5,329,975 | 7/1994 | Heitel | 141/19 |
| 5,366,745 | 11/1994 | Daden | 99/323.1 X |
| 5,417,146 | 5/1995 | Zimmer et al. | 220/565 X |
| 5,458,165 | 10/1995 | Liebmann | 141/98 X |

Primary Examiner—Timothy F. Simone
Attorney, Agent, or Firm—Paul E. Milliken; Lee A Germain

[57] ABSTRACT

A portable lightweight gas generation device which can be attached to a container to generate a quantity of gas from a mixture of two chemically reactive materials and to inject the gas into the container. The device is especially useful as an apparatus for rapidly carbonating liquid beverages with chemically generated carbon dioxide produced in a gas generation chamber located inside a pressure vessel attached to a liquid container which serves as a carbonation chamber containing the liquid to be carbonated. The generated carbon dioxide is passed from the gas generation chamber to the carbonation chamber to carbonate the liquid. This device can also be used as a means of injecting pressurized gas into a pressurized spray can for dispensing liquids such as paint, hair spray or other sprayable products.

26 Claims, 6 Drawing Sheets

GAS GENERATOR ATTACHMENT

RELATED INVENTIONS

This application is a continuation-in-part of Ser. No. 08/337,870, filed Nov. 14, 1994 now U.S. Pat. No. 5,4,60,846 which is a continuation-in-part of Ser. No. 08/215,424, filed Mar. 21, 1994 (now abandoned).

FIELD OF THE INVENTION

This invention relates to portable lightweight gas generation devices which can be attached to a container to inject a quantity of gas into the container and more specifically is especially useful as an apparatus for rapidly carbonating liquid beverages with chemically generated carbon dioxide produced in a gas generation chamber located inside a pressure vessel attached to a liquid container which serves as a carbonation chamber containing the liquid to be carbonated. The generated carbon dioxide is passed from the gas generation chamber to the carbonation chamber to carbonate the liquid.

This device can also be used as a means of injecting pressurized gas into a pressurized spray can for dispensing liquids such as paint, hair spray or other sprayable products. The gases generated for such pressurization should of course be those that are environmentally friendly and will not cause ozone depletion or create other undesirable environmental problems.

The present invention is an improvement over our prior invention described and claimed in our prior U.S. Pat. No. 5,260,081 issued Nov. 9, 1993 and is a further modification of the invention claimed in our prior application Ser. No. 08/337,870, now U.S. Pat. No. 5,460,846.

BACKGROUND OF THE INVENTION

Carbonated beverages range in variety from carbonated water, knows as soda water or sparkling water, to a carbonated water flavored with natural or artificial flavors such as orange, lemon-lime, cola, and many more.

The amount of carbon dioxide gas dissolved into these products is usually referred to as Volume of $CO_2$ per Volume of Liquid. The higher the volume of $CO_2$ per unit Volume of Liquid, the greater the sparkle and effervescence of the beverage. Although the desirable level of carbonation in a beverage is a matter of personal preference, packaged soft drinks are usually made with 3.5 to 4.0 volumes of carbon dioxide for colas, 4.0 to 5.0 Volumes of $CO_2$ for seltzers and soda water and generally less that 3.0 volumes for orange flavor. One of the disadvantages of packaged carbonated beverages is that the carbonation level is fixed and not available at different levels to suit different personal tastes.

Other disadvantages of packaged carbonated beverages include the unnecessary cost of packaging and transportation of a product that is comprised essentially of water and the cost of disposal or recycling of the package. Still further is the problem that once the pressurized beverage container is open to the atmosphere, the beverage left uncomsumed and unpressurized tends to lose carbonation and go flat thus wasting the unconsumed portion.

Several products have been developed to overcome the above noted problems and make possible the preparation of carbonated beverages in the home. Many of these products are described in several prior art patents discussed in our prior U.S. Pat. No. 5,260,081 and for the sake of brevity, these patents will not be repeated in this specification.

One of these prior patents which should be mentioned, however, is U.S. Pat. No. 4,040,342 (Austin), which discloses a gas generating chamber with a gas conduit extending into a carbonating chamber. After the chemical reaction is activated, the carbon dioxide flows into the carbonating chamber and carbonates the liquid contained therein. There are several limitations and problems with this device.

First, the time required to carbonate the liquid to 3 or more Volumes of $CO_2$ is fifteen minutes or greater. This is because the process of dissolving carbon dioxide into liquid occurs in two mechanisms; one quite rapid and the other quite slow. Some of the gas dissolves into the liquid as it bubbles to the surface and fills the head space of the carbonation tank. This $CO_2$ solution process occurs quite rapidly though it is, of course, dependent upon the rate of the chemical reaction producing the $CO_2$. Pressurized $CO_2$ in the head space acting upon the surface of the liquid is the other gas absorption mechanism. This absorption rate is slow because of the fixed interfacial exposure area between the $CO_2$ and the liquid. If this interfacial exposure area could be increased by agitation or by turbulent mixing as is taught by U.S. Pat. No. 4,719,056 (Scott) then $CO_2$ absorption would occur far more rapidly.

The other problem is the likely occurrence of transfer of some of the salt by-products of the $CO_2$ generation reaction into the liquid to be carbonated.

The reaction of edible acids (such as citric) with carbonates (such as sodium bicarbonate) in an aqueous solution is an endothermic reaction. When the reaction is first initiated, therefore, it is at its maximum temperature and its fastest reaction rate. In addition, the maximum amount of fuel for the reaction is present when it first begins. Therefore, during its initial stages the reaction produces considerable foaming and surface effervescence releasing a mist of reactant salt spray into the carbon dioxide gas being generated. This salt mist enters the carbonation chamber and ultimately the liquid being carbonated.

If hot water is used as the reactant water, the reaction rate is accelerated even further and salt contamination increases further.

For improved consumer convenience, the direct carbonation of premixed beverage is more desirable than the carbonation of unflavored water to which a flavoring must be added with each serving of soda water dispensed. With the Austin apparatus, U.S. Pat. No. 4,040,342, direct carbonation of premixed beverages would not be practical because premix flavoring syrups typically contain sugar and other ingredients that sufficiently alter the surface tension of the water syrup mix to cause the mixture to foam profusely; thus expelling much of the carbonation as it is dispensed from the pressurized carbonation vessel into a receptacle at atmospheric pressure. Most commercial soda fountains meter and mix flavoring syrup into the carbonated water after the water is dispensed from the pressurized carbonation vessel; therefore, when the syrup and carbonated water are combined, they are at atmospheric pressure (a process know in the industry as "post mix") and the foaming problem is avoided.

Three U.S. Patents which should be mentioned are U.S. Pat. No. 4,458,584 (Annese et al.), 4,466,342 (Basile et al.) and 4,475,448 (Shoaf et al.) These patents are all closely related to each other and describe a carbonation device in which a beverage container has a separate compartment inserted therein for holding carbon dioxide producing chemicals and a separate quantity of water is added to the chemicals before closing the lid to generate carbon dioxide gas for carbonation of a liquid beverage in the container. The containers in the above three patents do not have an overpressure relief valve, are not capable of withstanding the higher carbonation pressures generated by the present invention and would provide slower carbonation than the present invention. The present invention is easier to operate since the chemical reaction is started after closing the lid rather than while the lid is open.

U.S. Pat. No. 4,316,409 Adams et al. shows the concept of inverting the device to mix water with a solid carbonated ice briquette to generate carbon dioxide gas, however this has the disadvantage that the carbonated ice must be kept in a freezer to maintain it until it is used in the carbonation device. The basket structure of the Adams et al device would not be suitable for use with a powdered or liquid chemical to generate the carbon dioxide gas.

U.S. Pat. No. 4,786,519 Gupta uses a water soluble time delay package for containing the gas generating chemical and this is the very concept that the present invention seeks to avoid. Furthermore Gupta requires a connecting apparatus between the gas generating chamber and the beverage container while in the present invention the gas generating chamber is connected directly to the beverage container.

OBJECTS OF THE INVENTION

One object of this invention is to provide a means to rapidly carbonate liquids including premixed beverages, without the need for special water soluble packaging to contain the carbon dioxide producing chemicals.

Another object of this invention is to provide a small light weight gas generation apparatus for producing single batches of pressurized gas for insertion into pressurized dispensing containers to dispense fluid materials from the containers.

A further object of the invention is to provide a portable, easy to use beverage carbonating device that is attached to a container of liquid beverage and which generates carbon dioxide gas from mixing two different materials and transmits the gas to the interior of the beverage container to carbonate the beverage therein.

A still further object of the invention is to provide a beverage carbonator containing a filter means for preventing reaction salts from the gas generating reaction from passing into a beverage being carbonated.

An even further object of the invention is to provide an easy to use beverage carbonator having a gas generation chamber which attaches directly to an enclosed beverage container that also serves as a carbonation chamber which receives carbon dioxide gas generated within the gas generation chamber to carbonate a liquid beverage in the beverage container and which carbonator is thereafter removed from the beverage container.

These and other objects of the invention will become more fully apparent in the following specification and the attached drawings.

SUMMARY OF THE INVENTION

A gas generator device for removeable attachment to a gas receiving container in communication with an inlet opening thereof, the device comprising: a first cup means for retaining a first mixable substance, a second cup means for retaining a second mixable substance which is chemically reactive with the first substance when combined therewith, means combining the first and second substances in a common enclosed mixing location to induce a chemical reaction between the substances resulting in the generation of gas, a gas outlet in communication with the mixing location and with the inlet opening of the gas receiving container, and means removeably attaching the gas generator device to the gas receiving container at such a location on the container that the gas outlet of the gas generator device is in communication with the inlet opening of the gas receiving container to permit gas to flow from the gas generator device to the interior of the gas receiving container.

DESCRIPTION OF THE PREFERRED EMBODIMENTS

Figure 1:
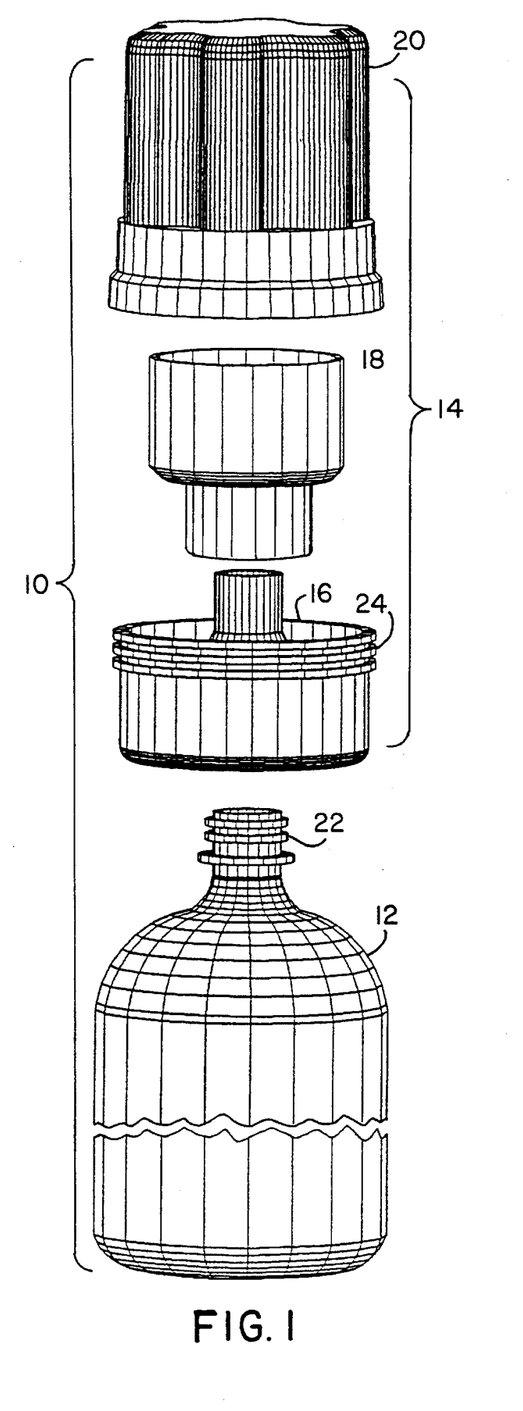
FIG. 1 is an exploded perspective view of the preferred embodiment of the invention.
Figure 2:
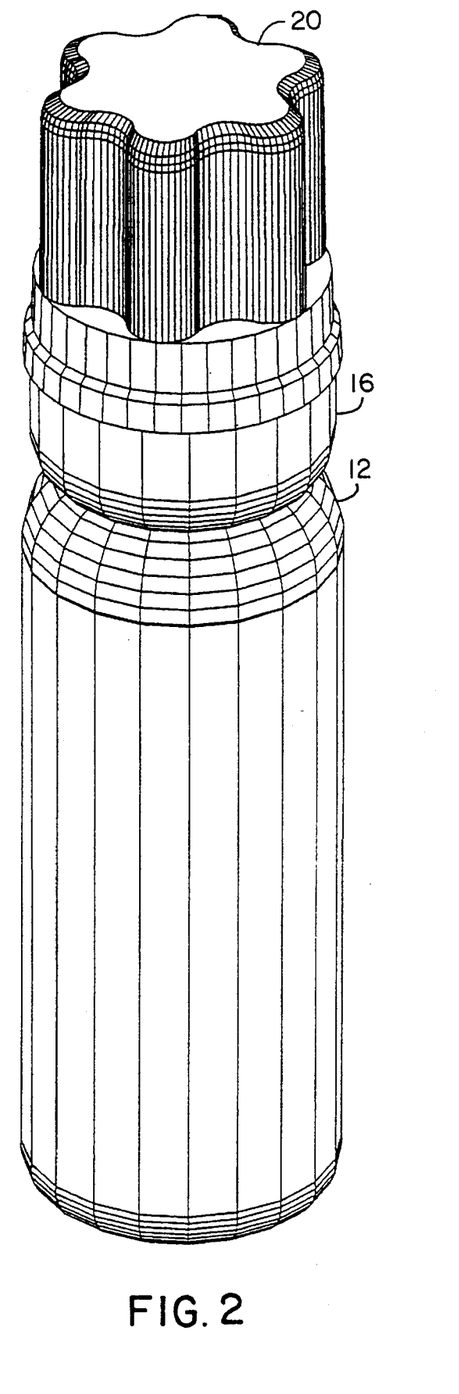
FIG. 2 is an assembled perspective view of the embodiment shown in FIG. 1.

Referring to the drawings and in particular FIGS. 1 and 2, the complete apparatus is a carbonator and container assembly 10, having a beverage container 12 and a carbonator assembly 14. The carbonator assembly has a water cup 16, a chemical cup 18 and a closure lid 20. The water cup 16 is screwed onto threaded neck 22 of the container 12. The chemical cup 18 sits in the water cup 16 in axial alignment therewith and the closure lid 20 screws onto circuferential threads 24 of the water cup to form the carbonator assembly 14 as further shown in FIG. 3. When the parts shown in FIG. 1 are completely assembled as shown in FIG. 2 they become a self contained working carbonator attached to a beverage container which also serves as the carbonation chamber during the carbonation process and thereafter becomes the storage container for the beverage.

The container 12 can be plastic or other suitable material and is capable of performing as a pressure vessel so that carbon dioxide gas can be injected under pressure into the container to carbonate a liquid beverage therein.

Figure 3:
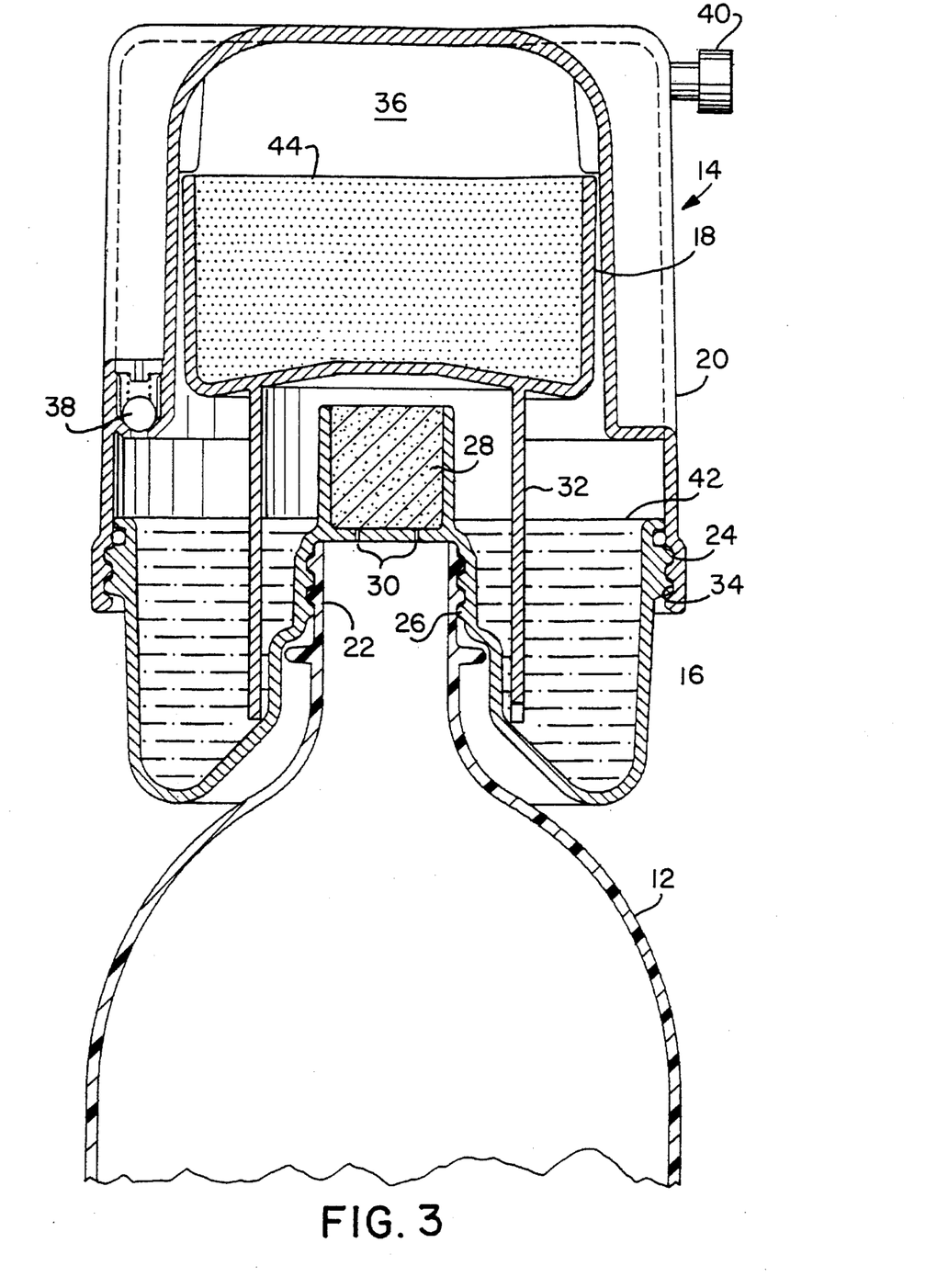
FIG. 3 is a fragmentary cross sectional view of the embodiment of FIG. 1.

As shown in FIG. 3, the water cup 16 is annular shape and has an internally threaded portion 26 which engages the threaded neck 22 on the container 12. The water cup also has a centrally located filter 28 axially aligned with the neck 22 and a plurality of holes 30 to permit carbon dioxide to pass from the filter 28 into the interior of the container 12.

The chemical or powder cup 18 has an open top for receiving a chemical material which could be in powdered or liquid form. The cup 18 has a downwardly extending hollow cylindrical wall 32 which surrounds the filter 28 when the chemical cup 18 is positioned in operative position within the water cup 16. The wall 32 provides a circuitous path of travel for the carbon dioxide gas during the carbonation process so that salt residues from the chemical reaction do not pass into the filter 28 and ultimately into the beverage being carbonated.

The lid 20 is preferably formed with an undulating contour for easy gripping when it is being screwed onto the water cup 16. The lid has internal threads 34 which engage the external threads on 24 on the water cup and when the lid 20 is screwed in place, it forms with the water cup 16 an enclosed chamber 36 for mixing the water and chemicals from cups 16 and 18 and for generating carbon dioxide gas. The lid 20 has a safety pressure release valve 38 to prevent overpressurization of the chamber 36 and a manual pressure release valve 40 to release pressure from the chamber 36 prior to unscrewing the carbonator assembly 14 from the beverage container 12.

FIG. 3 shows the water cup 16 filled with water 42 and the chemical cup 18 filled with chemical powder 44 which when mixed with water will generate carbon dioxide gas.

Figure 4:
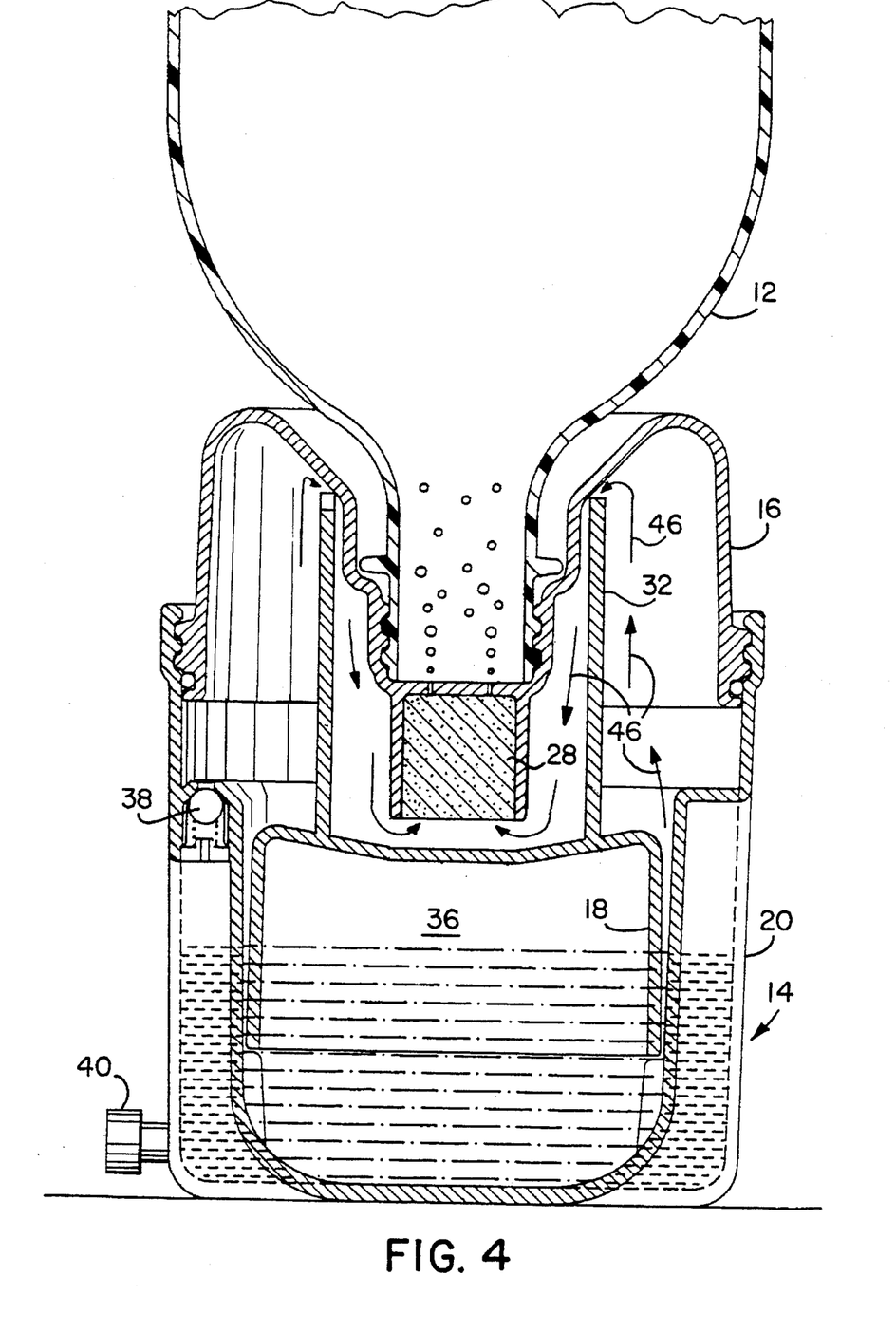
FIG. 4 is an inverted fragmentary cross sectional view of the embodiment shown in FIG. 3.

With the water cup 16 and the chemical cup 18 filled and the parts of the carbonator assembly 14 screwed together and onto the container 16, the entire assembly 10 is inverted as shown in FIG. 4, thereby dumping both the water 42 and the powder 44 together at the bottom of the lid 20 starting a chemical reaction to generate carbon dioxide within the chamber 36 from which it flows in the direction of the arrows in the open end of the cylindrical wall 32, into the inlet of the filter 28, and through holes 30 into the beverage container 12 to carbonate the beverage therein. By dumping both the water and powder in a common mixing container rather that merely dumping the water into the powder, this provides a more rapid mixing and a quicker chemical reaction since the powder can at least partially mix with the water while both are suspended in the air while falling into the mixing container and the powder particles are more loosely separated.

Figure 5:
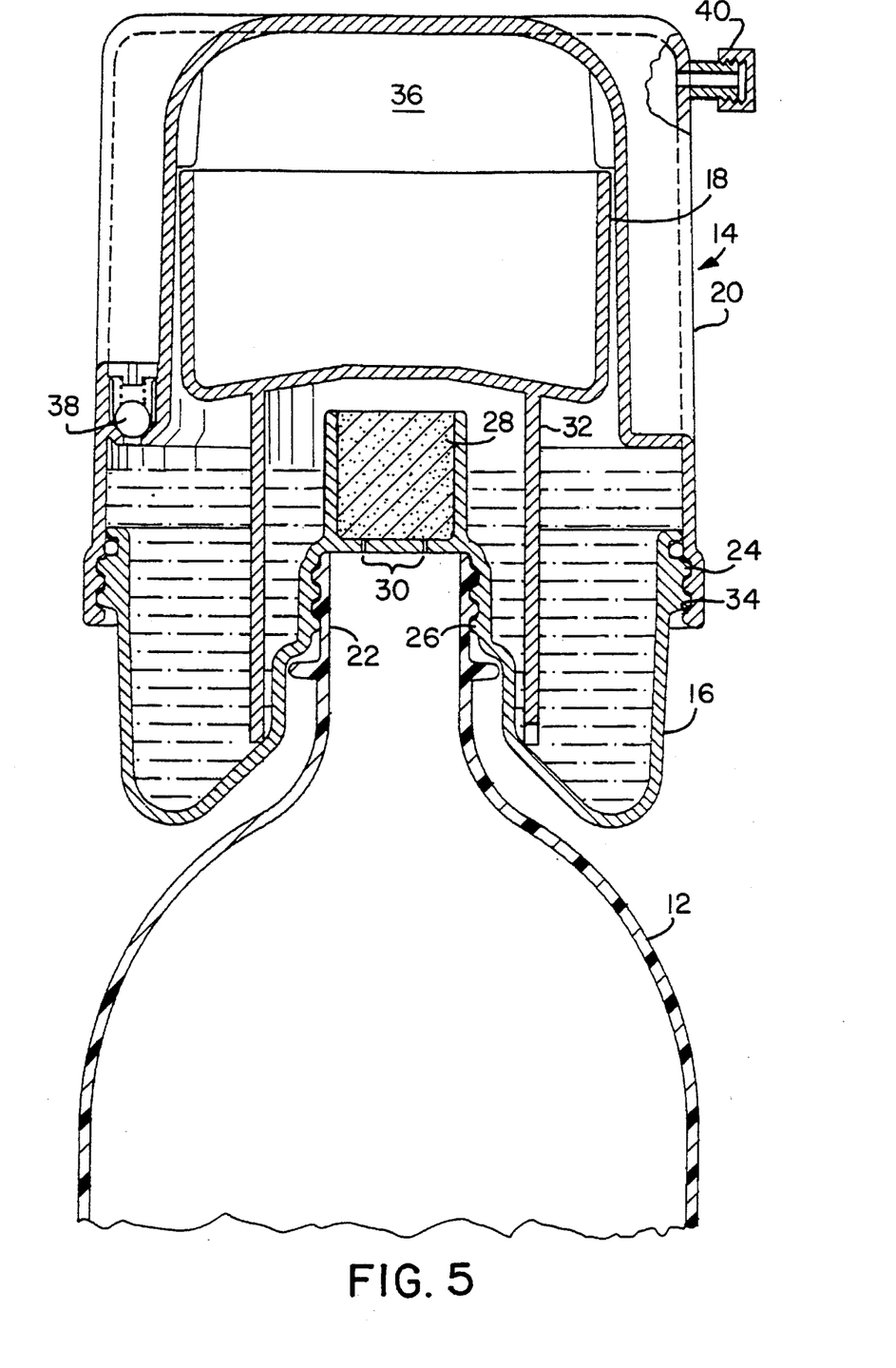
FIG. 5 is a fragmentary cross sectional view of the embodiment of FIG. 3 after it has been inverted and then returned to the position shown in FIG. 3.

The assembly 10 is then returned from to inverted position of FIG. 3 to the upright position shown in FIG. 5 with the carbonator assembly 14 on top of the container 16.

The valve 40 is then opened to release pressure from the chamber 36 and the carbonator assembly 14 can then be unscrewed from the beverage container 16 and a closure cap (not shown) can be screwed onto the container 16 to retain the carbonation in the beverage. The carbonator 14 can then be taken apart and the residue of the chemical reaction can be disposed of and the parts of the carbonator cleaned for the next time of use.

Figure 5A:
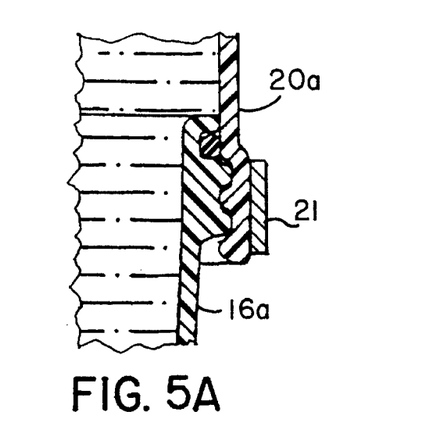
FIG. 5A is a fragmentary cross sectional view showing a modified threaded portion of the apparatus of FIG. 5 having a metal reinforcing band surrounding a plastic threaded portion.

In some instances it may be preferable to make the parts of the carbonator assembly 14 out of plastic as shown in FIG. 5A where the water cup 16a and closure lid 20a are screwed together. When plastic is used, it is sometimes desirable to add a circumferential metal reinforcing band 21 to prevent radial expansion of the threaded connecting portion thereby resulting in loss of gas pressure. The band 21 can be fastened adhesively to the outer periphery of the lid 20a or by other suitable means.

Figure 6:
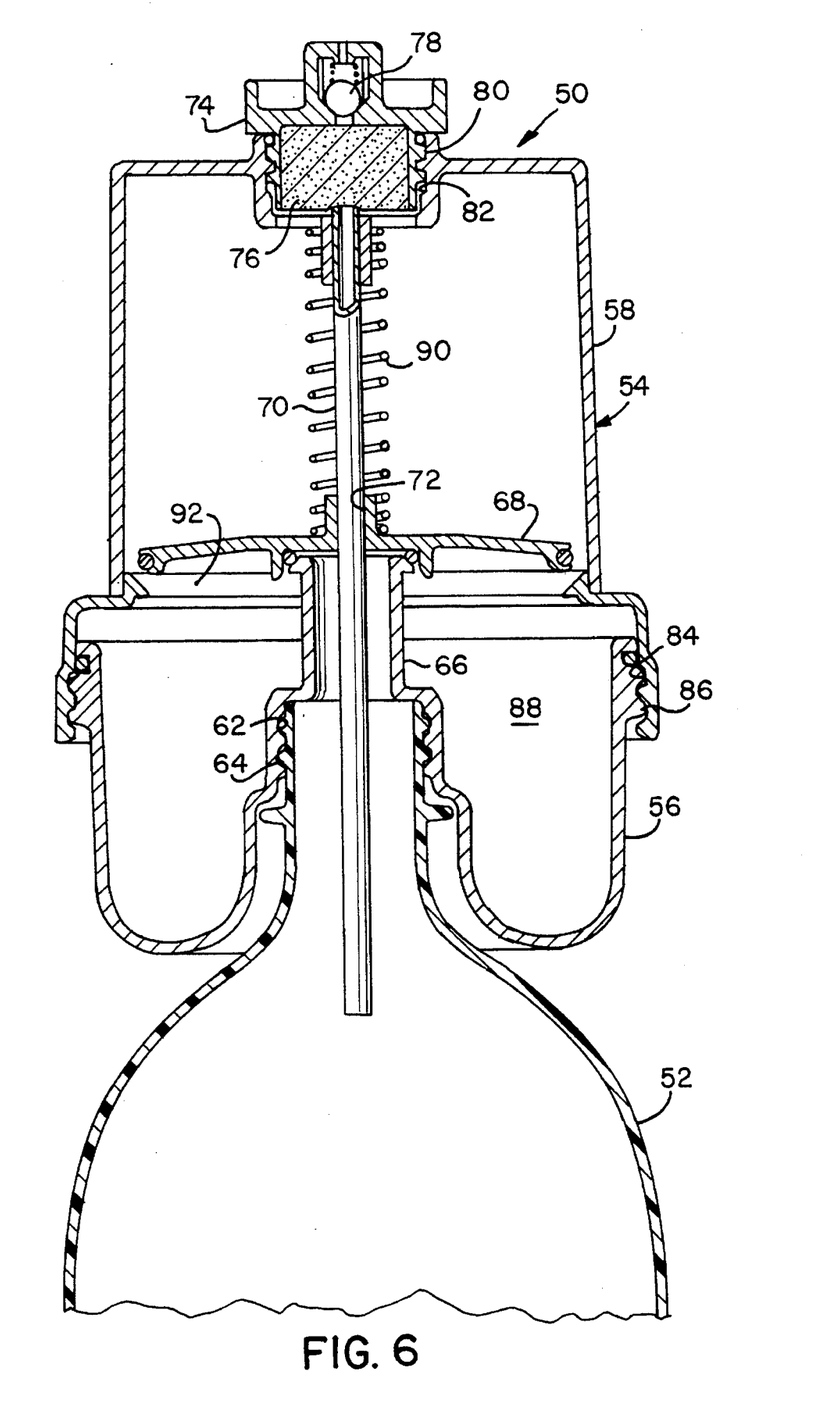
FIG. 6 is a fragmentary cross sectional view of another embodiment of the invention.

Another embodiment of the invention is shown in FIG. 6 which does not require that the assembly be inverted in order to activate the generation of carbon dioxide. In FIG. 6 the complete carbonator and container assembly is indicated generally by the numeral 50. The complete assembly 50 includes the beverage container 52 and the carbonator assembly 54.

In the carbonator assembly 54, a lower cup 56 serves as the powder cup and the upper cup 58 serves as the water cup. The lower or powder cup 56 is of annular shape and has a center portion 60 with internal threads 62 which engage a threaded neck 64 on the container 52. A hollow cylindrical projection 66 extends upwardly from the threads 62 to contact a vertically slidable bottom 68 of the water cup 58 which retains water in the cup when closed and releases the water when open. The bottom 68 slides up and down on a vertical tube 70 which passes through a center hole 72. The tube 70 is attached at the upper end to a removeable closure plug 74 containing a filter 76 and a pressure relief valve 78. The plug has external threads 80 which engage a threaded hole 82.

The water cup 58 has internal threads 84 near its bottom edge which engage external threads 86 at the upper edge of the powder cup 56 to permit the water cup 58 to be screwed onto the powder cup 56 to form an enclosed gas generating chamber 88. A coil spring 90 surrounding the tube 70 biases the bottom 68 downwardly to seal the hole 92 in the bottom of the water cup 58 so that water is retained therein.

In operation, the powder cup 56 is filled with carbon dioxide generating powder and screwed onto the beverage container 52 which has already been filled with a beverage to be carbonated. The water cup 58 is filled with water through the hole 82 with the spring 90 holding the bottom 68 closed. The plug 74 is then screwed into the hole 82. The water cup 58 is then screwed onto the powder cup 56. After the cup 58 is screwed on a sufficient distance, the bottom 68 contacts the upper end of the projection 66 and further screwing of the cap 58 causes the bottom 68 to be opened by the projection 66 which compresses the bottom against the spring 90. Once the bottom 68 is opened the water dumps from the cup 58 into the powder cup 56 and mixes with the powder to generate carbon dioxide gas. The gas flows upwardly through the filter 76 and down the tube 70 into the inside of the container 52 where it carbonates the beverage. Pressure is then released from the carbonator assembly 54 and the assembly is unscrewed from the container 52 which can then be capped to retain the carbonation. This embodiment does not, of course, need to be inverted in the matter of the embodiment in FIGS. 3–5.

Figure 7:
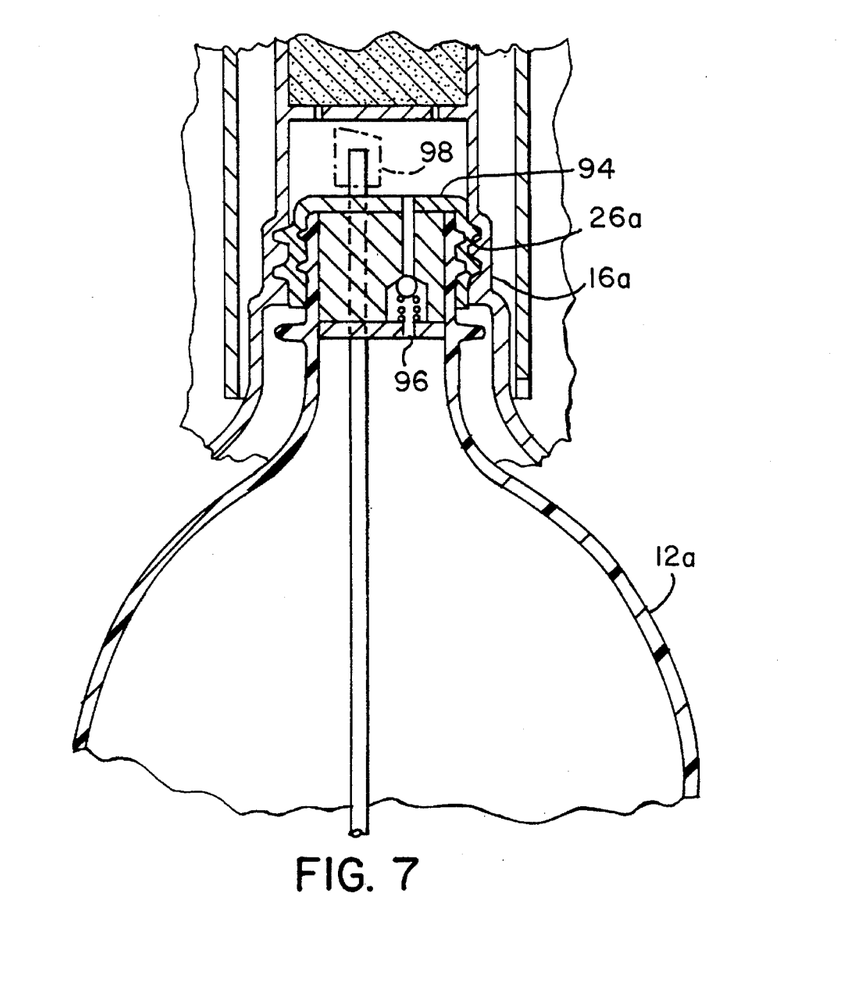
FIG. 7 is a fragmentary cross sectional view of a pressurized dispensing container having a gas generator attached to the inlet/outlet of the container.

As shown in FIG. 7, the embodiment of FIGS. 3–5 can be slightly modified to be used as a pressurizing means for a material dispensing container such as a paint sprayer or for dispensing various materials under pressure. The container 12a has a screw on cap 94 containing an inlet valve 96 and a spray valve mechanism 98 for dispensing material from the container 12a after it has been pressurized. In order to allow space from the valve 98 the filter 28a is placed higher that the filter 28 shown in FIG. 3. All the rest of the carbonator assembly can be the same as that shown in FIGS. 3–5 except that the threaded hole 26a in the water cup 16a is sufficiently large to fit over the cap 94 instead of directly on the neck of the container 12a. It can also be seen that the device shown in FIG. 6 could also be adapted to fill a spray dispensing container such as 12a.

A cap and inlet check valve similar to the cap 94 and valve 96 shown in FIG. 7 can also be used with a beverage container to retain pressure within the beverage container during and after removal of the carbonator assembly. Thus the carbonation is retained in the beverage until it is ready for use.

These and various other modifications can be made in the embodiments described and claimed herein without departing from the scope of the invention.

We claim:

1. A gas generator device for removeable attachment to a gas receiving container in communication with an inlet opening thereof, the device comprising:
   a first cup means for retaining a first mixable substance;
   a second cup means for retaining a second mixable substance which is chemically reactive with the first substance when combined therewith;
   means combining the first and second substances in a common enclosed mixing location to induce a chemical reaction between the substances resulting in the generation of gas;
   a gas outlet in communication with the mixing location and with the inlet opening of the gas receiving container; and
   means removeably attaching the gas generator device to the gas receiving container at such a location on the container that the gas outlet of the gas generator device is in communication with the inlet opening of the gas receiving container to permit gas to flow from the gas generator device to the interior of the gas receiving container.

2. A gas generator device as claimed in claim 1 including a mixing container mounted in a fixed location above the first and second cup means and having a downwardly facing opening in alignment with the cup means and wherein both the first and second cup means are at least partially open at the top to permit simultaneous dumping of the substances from both the cup means into the mixing container when the gas generator device is moved into an inverted position.

3. A gas generator device as claimed in claim 1 wherein the first cup means is attached to the gas receiving container, the second cup means is mounted above the first cup means in fixed relationship therewith and the second cup means has a bottom opening means to permit dumping of the second mixable substance into the first cup means for mixing with the first mixable substance.

4. A gas generator device as claimed in claim 1 wherein the first cup means is threadably attached to a threaded port at the inlet opening of the gas receiving container and the second cup means is mounted on top of the first cup means and retained in position by a downwardly facing mixing container which is threadably attached to the first cup means.

5. A gas generation device as claimed in claim 4 wherein the at least the mixing container is made of plastic and has a circular metal reinforcing band extending around the circumference of thereof in the area of threadable attachment to the first cup means.

6. A gas generator device as claimed in claim 1 wherein at least one of the cup means is of annular shape.

7. A gas generator device as claimed in claim 1 including a filter means at the gas outlet of the gas generator device to prevent residue from the gas generating chemical reaction from passing with the generated gas into the gas receiving container.

8. A gas generator device as claimed in claim 1 including a check valve located in the inlet opening of the gas receiving container to maintain pressure in the gas receiving container when the gas generator is being detached from the gas receiving container.

9. A gas generator device as claimed in claim 1 including a manually operable pressure relief valve to release pressure from the interior of the gas generator device after completion of the gas generating chemical reaction.

10. A gas generator device as claimed in claim 1 including shield means mounted inside the gas generator and surrounding the gas outlet of the gas generator for preventing chemical reaction residue from passing from the mixing location into the gas receiving container.

11. A gas generator device as claimed in claim 10 wherein the shield means is a cylindrical wall attached to one of the cup means to provide a circuitous annular passageway between the mixing location and the outlet of the gas generator.

12. A gas generator device as claimed in claim 1 wherein the gas receiving container is a fluid material dispensing container having a material dispensing valve and a gas pressure receiving inlet valve and wherein gas pressure injected into the container causes material to be dispensed from the container after it is detached from the gas generator and when the dispensing valve is opened.

13. A carbon dioxide gas generator device for removeable attachment to a liquid beverage container in communication with an inlet opening thereof, the device comprising:
   a first cup means for retaining a quantity of water;
   a second cup means for retaining a second substance which is chemically reactive with the water when combined therewith to generate carbon dioxide gas;
   means combining the water and chemically reactive substance in a common enclosed mixing location to induce a chemical reaction therebetween resulting in the generation of carbon dioxide gas;
   a gas outlet in communication with the mixing location and with the inlet opening of the beverage container; and
   means removeably attaching the gas generator device to the beverage container for receiving generated carbon dioxide gas at such a location on the container that the gas outlet of the device is in communication with the inlet opening of the container to permit carbon dioxide gas to flow from the gas generator device to the interior of the container to carbonate liquid beverage therein.

14. A gas generator device as claimed in claim 13 including a mixing container mounted in a fixed location above the first and second cup means and having a downwardly facing opening in alignment with the cup means and wherein both the first and second cup means are at least partially open at the top to permit simultaneous dumping of the substances from both the cup means into the mixing container when the gas generator device is moved into an inverted position.

15. A gas generator device as claimed in claim 13 wherein the first cup means is attached to the gas receiving container, the second cup means is mounted above the first cup means in fixed relationship therewith and the second cup means has a bottom opening means to permit dumping of the second mixable substance into the first cup means for mixing with the first mixable substance.

16. A gas generator device as claimed in claim 13 wherein the first cup means is threadably attached to a threaded port at the inlet opening of the gas receiving container and the second cup means is mounted on top of the first cup means and retained in position by a downwardly facing mixing container which is threadably attached to the first cup means.

17. A gas generation device as claimed in claim 16 wherein the at least the mixing container is made of plastic and has a circular metal reinforcing band extending around the circumference of thereof in the area of threadable attachment to the first cup means.

18. A gas generator device as claimed in claim 13 wherein at least one of the cup means is of annular shape.

19. A gas generator device as claimed in claim 13 including a filter means at the gas outlet of the gas generator device to prevent residue from the gas generating chemical reaction from passing with the generated gas into the gas receiving container.

20. A gas generator device as claimed in claim 13 including a check valve located in the inlet opening of the gas receiving container to maintain pressure in the gas receiving container when the gas generator is being detached from the gas receiving container.

21. A gas generator device as claimed in claim 13 including a manually operable pressure relief valve to release pressure from the interior of the gas generator device after completion of the gas generating chemical reaction.

22. A gas generator device as claimed in claim 13 including shield means mounted inside the gas generator and surrounding the gas outlet of the gas generator for preventing chemical reaction residue from passing from the mixing location into the gas receiving container.

23. A gas generator device as claimed in claim 22 wherein the shield means is a cylindrical wall attached to one of the cup means to provide a circuitous annular passageway between the mixing location and the outlet of the gas generator.

24. The combination of a container and a gas generator device for removeable attachment thereto in communication with an inlet opening of the container, to pressurize the container for dispensing a flowable substance therefrom, the device comprising:

a first chamber for retaining a first mixable substance;

a second chamber for retaining a second mixable substance which is chemically reactive with the first substance when combined therewith;

means combining the first and second substances in a common enclosed mixing location to induce a chemical reaction between the substances resulting in the generation of gas;

a gas outlet in communication with the mixing location for release of generated gas; and a container for holding a flowable substance said container having an inlet opening with a closure means located therein having an inlet passage for receiving generated gas and a dispensing valve for releasing the flowable substance from the container upon demand; and means removeably attaching the gas generator device to the container for receiving generated gas at such a location on the container that the gas outlet of the generator device is in communication with the inlet passage of the closure means to permit gas to flow from the gas generator device to the interior of the container;

said gas generator device being detached from the container prior to activation of the dispensing valve.

25. A gas generator device as claimed in claim 24 wherein the gas receiving container is a fluid material dispensing container having a material dispensing valve and a gas pressure receiving inlet valve and wherein gas pressure injected into the container causes material to be dispensed from the container after it is detached from the gas generator and when the dispensing valve is opened.

26. An apparatus for rapidly carbonating a liquid beverage comprising:

a pressure vessel forming a carbonation chamber on the interior thereof;

a removeable container assembly adapted to be positioned in a fixed position relative to the pressure vessel, the container assembly when assembled, being capable of forming a gas generation chamber, the container assembly including a chemical container for containing a quantity of carbon dioxide generating compound, and a water container above the chemical container for retaining a quantity of water, the water container having a bottom opening in communication with the chemical container;

a moveable bottom closure member sealingly closing the bottom opening of the water container to retain water therein;

a first retaining means to hold the container assembly at a fixed location relative to the pressure vessel;

a second retaining means to retain the container assembly in an assembled position to form a gas generation chamber capable of containing and releasing pressure generated therein during the generation of carbon dioxide gas;

actuation means to cause opening of the bottom closure member to release water from the water container into the gas generation chamber;

connecting means extending between the carbon dioxide generating chamber and the carbonation chamber to permit carbon dioxide gas to flow from the generation chamber to the carbonation chamber;

means to release pressure from the carbonation chamber; and outlet means to remove liquid from the carbonation chamber.

* * * * *